US005206668A

United States Patent [19]

Lo et al.

[11] Patent Number: 5,206,668

[45] Date of Patent: Apr. 27, 1993

[54] METHOD AND APPARATUS FOR DETECTING INK FLOW

[75] Inventors: Clement C. Lo, Lake Oswego; Izadpour Khormaee, West Linn, both of Oreg.

[73] Assignee: Hewlett-Packard Company, Palo Alto, Calif.

[21] Appl. No.: 784,185

[22] Filed: Oct. 29, 1991

[51] Int. Cl.[5] .................. G01D 15/16; G01D 15/18

[52] U.S. Cl. .................. 346/140 R; 346/75

[58] Field of Search .................. 346/140 R, 75

[56] References Cited

U.S. PATENT DOCUMENTS

| | | | |
|---|---|---|---|
| 4,326,199 | 4/1982 | Tarpley et al. | 340/622 |
| 4,853,718 | 8/1989 | ElHatem et al. | 346/140 R |
| 4,910,528 | 3/1990 | Firl et al. | 346/1.1 |
| 4,935,751 | 6/1990 | Hamlin | 346/140 R |
| 4,940,997 | 7/1990 | Hamlin | 346/140 R |
| 4,973,993 | 11/1990 | Allen | 346/140 R |

FOREIGN PATENT DOCUMENTS

| | | | |
|---|---|---|---|
| 0353925 | 2/1990 | European Pat. Off. | |
| 0155960 | 9/1983 | Japan | 346/140 R |
| 0098542 | 9/1986 | Japan | |
| 0206657 | 9/1986 | Japan | 346/140 R |
| 0290064 | 12/1986 | Japan | 346/140 R |
| 0039261 | 2/1987 | Japan | |

*Primary Examiner*—Benjamin R. Fuller
*Assistant Examiner*—Eric Frahm

[57] ABSTRACT

A method and apparatus for detecting the sufficiency of ink flow through the printhead of an inkjet pen comprises sensing the temperature of the printhead substrate as the inkjet pen prints a test pattern into the printer spittoon. The method compares a first change in temperature resulting from printing one portion of the pattern to a second change in temperature resulting from printing a second portion of the pattern. Based on this comparison, the sufficiency of the ink flow is determined. The comparison is done using a ratio of the second temperature change to the first temperature change. As the ink flow decreases, the second change in temperature rises faster than the first change in temperature and thus the ratio increases. By monitoring the ratio, comparing it to predetermined values and repeating the test pattern on a periodic basis, the method determines when the ink flow has dropped to a point that the pen should be replaced. To prevent the loss of printed material, once a maximum ratio is exceeded the operator is notified and printing is stopped.

20 Claims, 5 Drawing Sheets

METHOD AND APPARATUS FOR DETECTING INK FLOW

BACKGROUND OF THE INVENTION

This invention relates to thermal inkjet printing and, more particularly, to detecting the sufficiency of ink flow through the printhead of a thermal printing device such as a computer printer, facsimile machine or the like.

Thermal inkjet printing is now a common method of producing high quality, low cost printing with computer printers, facsimile machines and potentially with copiers and other devices as well. The basic design and operation of inkjet printing devices are well known and amply described in U.S. Pat. No. 4,910,528, owned by the present assignee and hereby incorporated by reference. Such devices use an inkjet pen (also known as an ink cartridge), which includes an ink container and printhead through which ink from the container is ejected onto the print media.

One concern with inkjet printing is the sufficiency of ink flow to the paper or other print media. Print quality is a function of, among other things, ink flow through the printhead. Too little ink on the paper produces faded and hard-to-read printed documents. In a worst case, no ink may be printed and the entire document is lost. This scenario may occur where a facsimile machine, out of ink, receives a transmission when unattended and attempts to print. Since the inkjet pen moves across the media even when no ink is being ejected, the facsimile machine mistakenly assumes that the transmission has successfully been received and acknowledges reception to the sender.

One approach to detecting the sufficiency of ink mechanically in inkjet printing is described in U.S. Pat. No. 4,935,751, also assigned to the present assignee. The ink pen therein houses a contractible ink bag to which is attached a rigid strip. The top end of the pen housing is a window revealing the end of the strip. A scale may be attached to the window. As the ink bag depletes, it contracts and pulls the strip across the window. An observer can manually tell from the position of the strip the relative amount of ink that is left in the bag and thereby the sufficiency of ink for printing. Another mechanical technique using a ball check valve is disclosed in U.S. Pat. No. 4,940,997.

A second approach is to place a capacitive sensor on the printhead, as disclosed in U.S. Pat. No. 4,853,718. The capacitance is a function of the amount of ink present in a channel connecting the ink reservoir to the inkjet of the printhead. With ink present, a charge on the capacitor leaks off quickly. With ink absent, the charge leaks off slowly. A sampling circuit designed to measure the capacitor voltage at a certain interval detects whether there is ink in the channel. Although plausible, this approach requires the addition of relatively complex and costly circuitry to the printing device.

A third approach is to place a thermistor (a semiconductor device whose electrical resistance is dependent upon temperature) directly in the ink channel. Ink has a greater thermal conductivity than air, and the resistance of the thermistor rises as air replaces ink in the channel. The drawback of this approach is that, over time, deposits form on the thermistor which cause it to give an erroneous output. A similar technique wherein a temperature sensor is surrounded by gas or liquid is described in U.S. Pat. No. 4,326,199.

SUMMARY OF THE INVENTION

An object of the invention, therefor, is to provide a reliable method of detecting the sufficiency of ink flow through a thermal inkjet printhead which overcomes the drawbacks of the prior art.

Another object of the invention is to provide such a method that relies on the temperature of the printhead as an indicator of the sufficiency of ink.

Yet another object of the invention is to implement such a method using a minimum of low cost, additional components to the printing device.

To achieve these objects, a method and apparatus for detecting the sufficiency of ink flow in accordance with the invention is described. The method includes sensing the temperature of the printhead as it prints and comparing a first change in temperature of the printhead at one point in printing to a second change in the temperature at another point in printing. Based on the comparison of temperature changes, the method determines the sufficiency of ink flow through the printhead.

The apparatus includes a temperature sensor such as a thermal sense resistor and detection circuitry in communication with the sensor. The detection circuitry compares the temperature changes and based on this comparison, makes the determination of the ink flow.

The foregoing and other objects, features, and advantages of the invention will become more apparent from the following detailed description of a preferred embodiment which proceeds with reference to the accompanying drawings.

DESCRIPTION OF A PREFERRED EMBODIMENT

Figure 1:
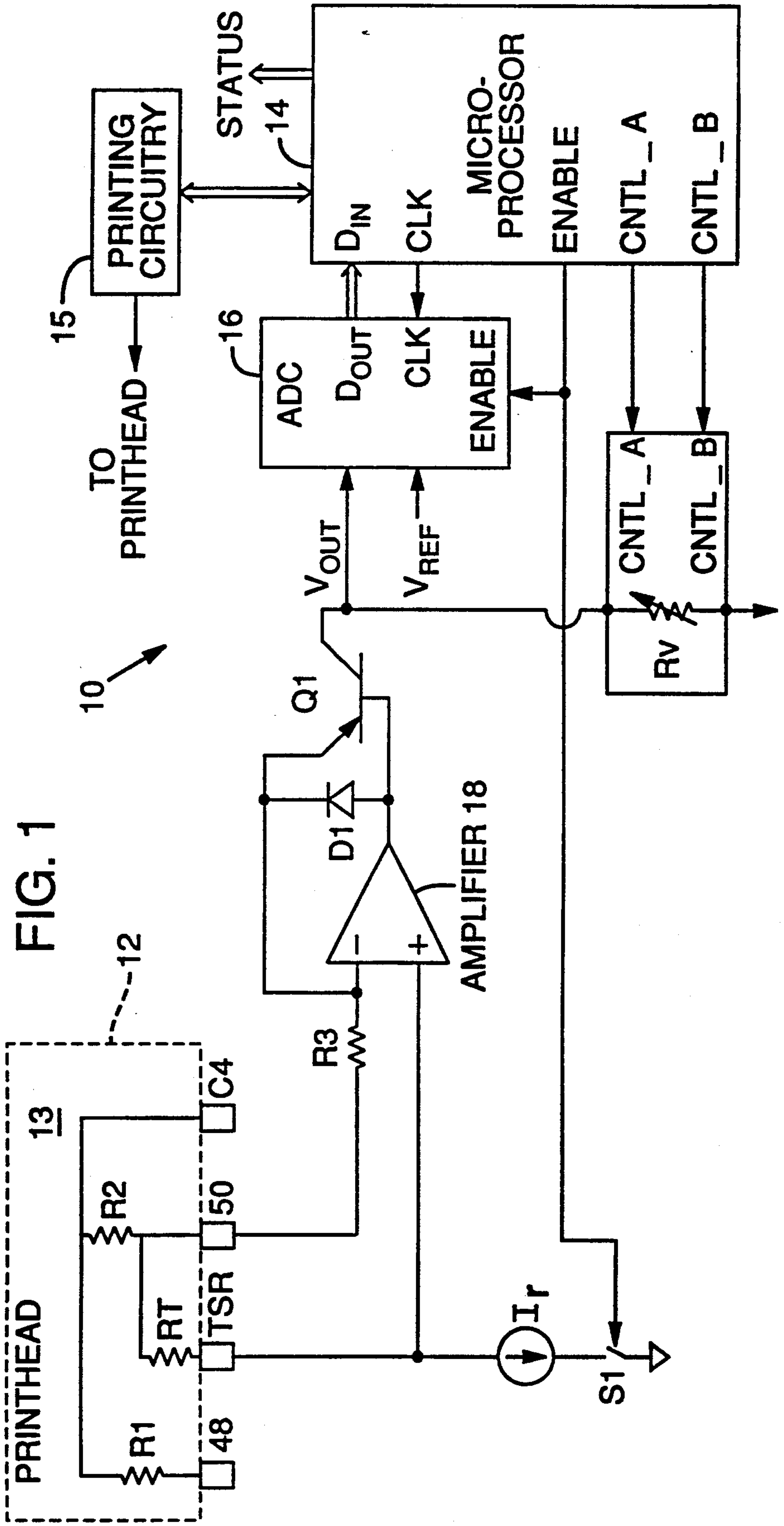
FIG. 1 is a schematic diagram of apparatus according to the invention.

Referring to FIG. 1, there is shown a schematic diagram of an apparatus according to the invention in the form of a circuit 10. The circuit is preferably mounted within the printing device it controls. At the left of the figure is a portion of a thermal inkjet printhead 12 of conventional design such as of the type shown and described in U.S. Pat. No. 4,910,528, including heater resistors such as R1, R2 and a thermal sense resistor RT. RT is a temperature sensor whose resistance increases with temperature. In the present embodiment it is deposited on the printhead substrate 13 as a thin film resistor along with the heater resistors using a conventional process. The substrate, which is normally silicon, has a high thermal conductivity and will heat up as the heater resistors are pulsed to eject ink drops through the nozzles of the printhead. The substrate, in turn, heats up the thermal sense resistor RT, thereby increasing its resistance.

The rate of temperature rise of the substrate toward an equilibrium value depends, among other things, upon the volume of ink being ejected from the nozzles during printing. The rate increases as the volume of ink drops ejected during printing decrease. The reason for this phenomena is that the liquid ink leaving the printhead removes heat from the printhead. As the amount of liquid ink being ejected decreases, the amount of heat energy being removed decreases. The heat formerly removed by the ink flow is instead absorbed by the printhead substrate 13, which causes the substrate's temperature to rise at a faster rate than it otherwise would.

The circuit 10 uses this phenomena to detect the sufficiency of ink-flow through the thermal inkjet printhead 12. The sensor RT senses the temperature of the printhead 12 as it prints. Detector circuitry within circuit then compares a first change in temperature of the printhead at one point in printing with a second change in the temperature of the printhead at another point of printing. Based on that comparison, the detector circuitry determines the sufficiency of the ink flow through the printhead.

The possible designs for the detector circuitry are many, and may vary from a hardware approach using just analog circuits and logic gates to an equivalent software approach using solely a data processor. The present design is preferred because of it reliability, low cost and ability to tolerate thermal sense resistors having a wide variation in resistance.

The detector circuitry within circuit 10 includes a number of elements including a data processor such as a microprocessor 14. Microprocessor 14 is also used for control of the printing through conventional printing circuitry 15 that pulses the heater resistors such as R1 and R2. Connected to a data port of the microprocessor 14 is an analog-to-digital converter (ADC) 16 which converts an analog signal proportional to the resistance of RT into a digital signal that may be evaluated by the processor. Also connected to the processor 14 and responsive to its control is a variable resistor Rv. Resistor Rv is part of a gain circuit which also includes an operational amplifier 18, a resistor R3 connected between the inverting input of the amplifier and heater resistor R2, and a transistor Q1 connected to the output of the amplifier. Thermal sense resistor RT is connected to the noninverting input of the amplifier 18 and also to a current source $I_r$ controlled by a switch S1. Current source $I_r$ produces a voltage across RT which is used to measure its resistance. Switch S1 is responsive to an enable signal from processor 14. When S1 is closed, the detector circuitry operates to measure and compare temperature changes of the printhead in a manner to be described.

With this detection circuitry, a gain-adjusted voltage $V_{OUT}$ proportional to the thermally-induced resistance of RT is produced according to the following equation:

$$V_{OUT}=RT*I_r*(Rv/R3) \quad (1)$$

$D_{OUT}$, an 8-bit digital equivalent of $V_{OUT}$, is produced by the ADC 16 in response to enable signals from the processor 14. The value of $D_{OUT}$ can range from 0 to 255 and is directly proportional to the resistance of RT.

The gain circuit comprising amplifier 18, resistors R3 and Rv, and transistor Q1 is incorporated into the detector circuitry so that the resistance of RT need not be finely controlled during manufacture. Variations in its resistance can be compensated for by changing the value of variable resistor Rv in a manner to be described. Table I below illustrates that the resistances for Rv depend on the output sent by the data processor 14 from pins CNTL_A and CNTL_B to Rv:

TABLE I

| | CNTL_A | CNTL_B | VR RESISTANCE |
|---|---|---|---|
| Range 0 | Low | Low | 12.1 kΩ |
| Range 1 | Low | High | 7.2 kΩ |
| Range 2 | High | Low | 4.3 kΩ |
| Range 3 | High | High | 3.5 kΩ |

The resolution provided by $D_{OUT}$ is greatest when the range of resistance for RT is smallest across the 256 values. Table II illustrates that the higher the gain provided by RT, the better the resolution and thus the accuracy of the measurement of the temperature changes in the printhead substrate 13:

TABLE II

| | Range of RT | |
|---|---|---|
| | Lower Limit, | Upper Limit |
| With R3 = 1kΩ; $V_{REF}$ = 2.5V | $D_{OUT}$ = 0 | $D_{OUT}$ = 255 |
| Range 0 | 10.33Ω | 20.62Ω |
| Range 1 | 17.36Ω | 34.65Ω |
| Range 2 | 29.07 | 58.03Ω |
| Range 3 | 35.71 | 71.29Ω |

Figure 2:
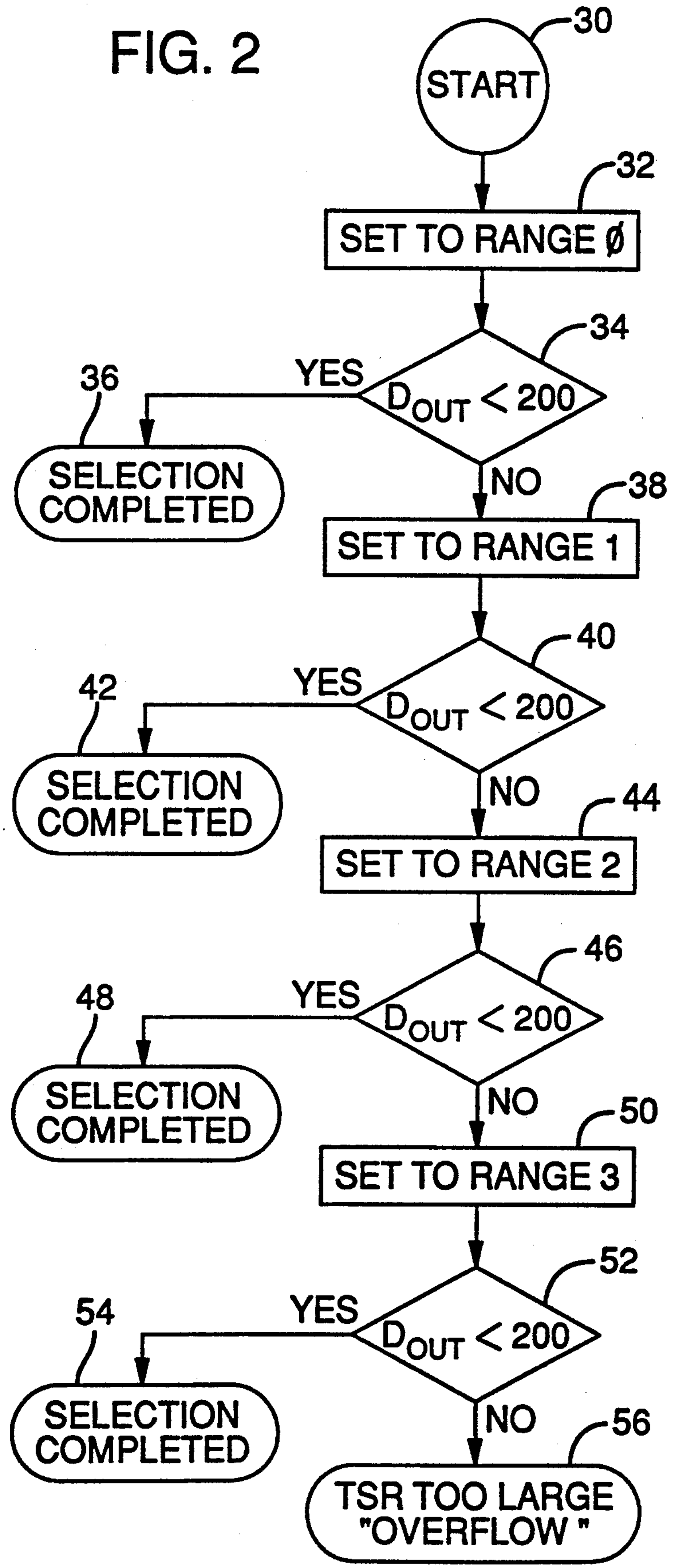
FIG. 2 is a flowchart illustrating a method of auto selecting a gain to be applied to the resistance of a thermal sense resistor before determining ink flow.

FIG. 2 illustrates a method programmed into the processor 14 for setting the gain of $V_{OUT}$ to select the greatest resolution of $D_{OUT}$ for a given range of resistance of RT, while insuring $D_{OUT}$ does not overflow its eight-bit count. Each decrease in gain increases the resistance range of RT and thereby reduces the digital resolution of the resistance. It is known from study and design of RT that $D_{OUT}$ will increase a maximum of 55 counts as the resistance of RT varies from a cold state to its warmest state. To accommodate this potential rise, the gain is selected so that the 'cold' resistance of RT as represented by $D_{OUT}$ is less than 200. For clarity, each step of the method shown in FIG. 2 and subsequent flowcharts and described herein will be noted with a reference numeral in parentheses.

The method of adjusting the resistance of Rv starts each time the printing device containing the inkjet pen is powered up or each time the pen is replaced (30). This is preferred because a new pen will likely have a thermal sense resistor RT with different resistive characteristics than the RT in the replaced pen. The processor 14 initially sets the variable resistance to range 0, the highest gain, to seek the best possible resolution (32). It then checks the output of ADC 16 to determine if it is less than 200 (34). The printhead at this point is cool since the pen has been idle and thus the resistance measured is the lowest resistance of RT. If the output of $D_{OUT}$ is less than 200, then range 0 provides a sufficient range of digital values and the selection of Vr is complete (36). However, if $D_{OUT}$ is equal to or greater than 200, then the gain for $V_{OUT}$ must be adjusted downward by setting Vr to the next lowest range 1 (38). Again $D_{OUT}$ is checked (40) and if it is now less than 200 the selection process is complete (42). If not, the selection process continues by setting the range to range 2 (44), checking $D_{OUT}$ (46) and completing the selection if appropriate (48). If $D_{OUT}$ is at least 200, Vr is set to the lowest range, range 3 (50), and $D_{OUT}$ is checked a last time (52). If $D_{OUT}$ is now less than 200, the selection process is complete (54). If not, the resistance of RT is simply too large to provide a usable range of values (56).

In most cases, the overflow result cannot occur because the process for making RT is sufficiently stringent to produce a resistance within a set range. If it does occur, the printing device will not operate and preferably will indicate the nature of the malfunction to the operator. This may be done by the microprocessor 14 alerting a display device via signals on a status line (FIG. 1).

Figure 3:
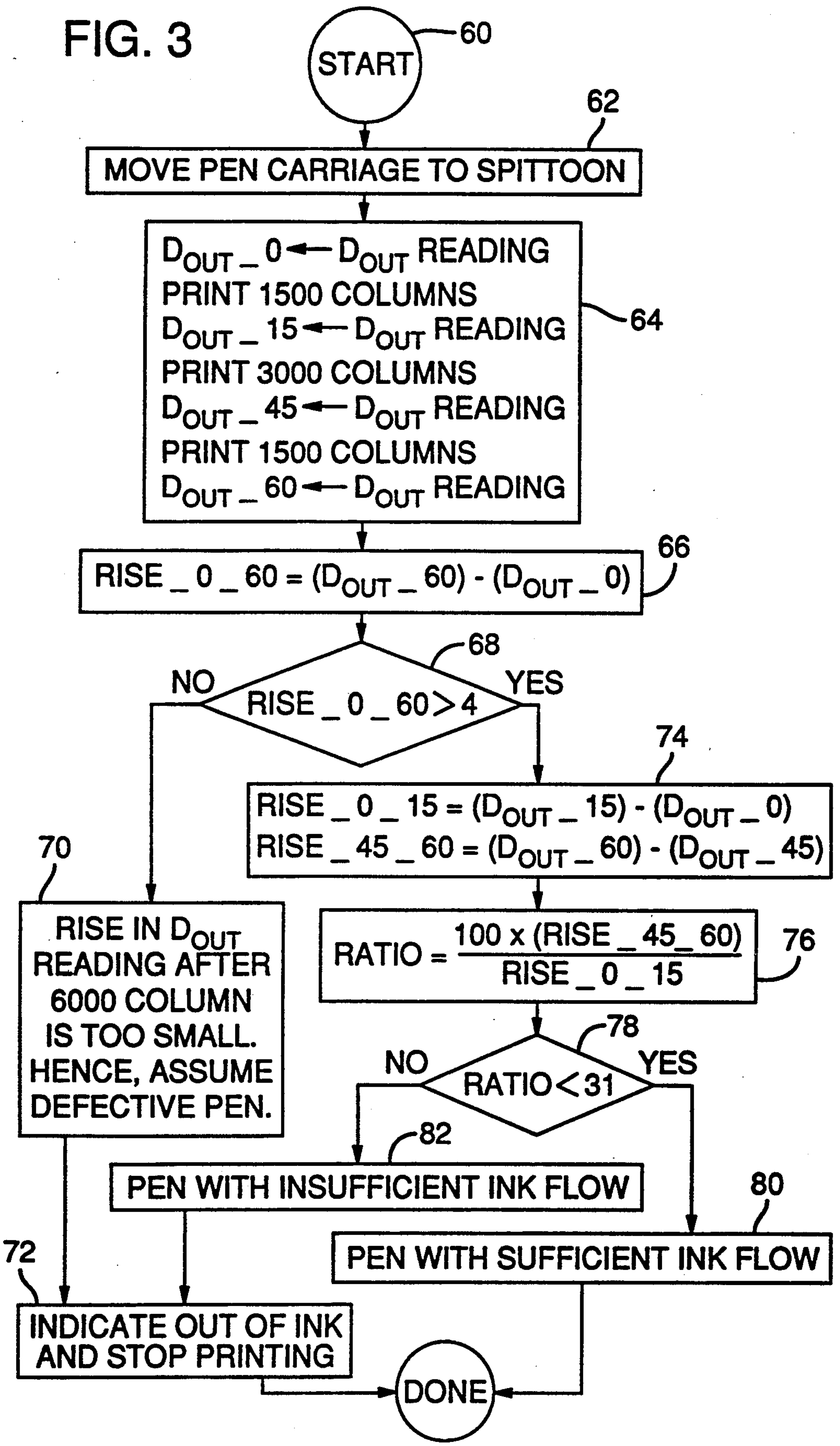
FIG. 3 is a flowchart illustrating a method of detecting a sufficient ink flow through the printhead of the printing device.
Figure 4:
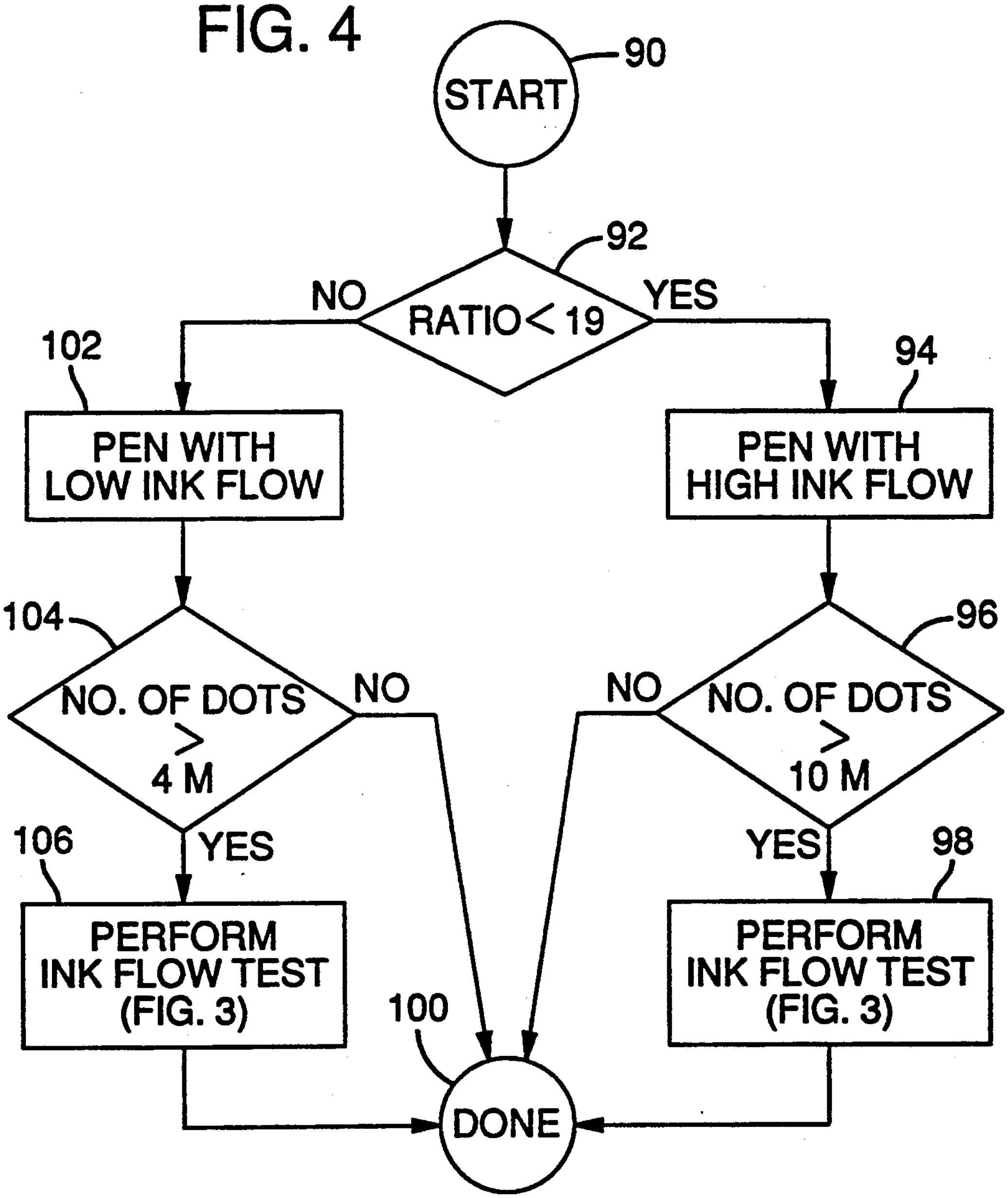
FIG. 4 is a flowchart illustrating a method of deciding when to perform the method of FIG. 3.

With the value of Rv set, the processor 14 begins the detection method illustrated in FIGS. 3 and 4. On power up and after each printing of a predetermined number of dots, the method starts (60) by moving the pen carriage to the printer spittoon wherein the printhead ejects ink in a test pattern (62). The processor 14 then causes the pen via printing circuitry 15 to print the test pattern comprising 6000 columns of 50 dots each and records the temperature of the substrate as represented by $D_{OUT}$ at predetermined dots intervals. In the present embodiment, these dot intervals are at the beginning of the test pattern and after the printing of 1500, 4500 and 6000 columns. Other test patterns and dot intervals are, of course, possible for accomplishing this function. Preferably, the pen is held stationary at the spittoon to direct the ink therein during the printing, though the pattern could be printed on paper if desired.

A temperature change caused by the printing of the entire test pattern is then calculated to determine if the pen is defective (66). If the entire change in temperature (as recorded by the count of $D_{OUT}$ from the beginning to end) is less than a minimum amount such as 4 (68), then the pen is determined to be defective (70) and the operator is notified (72). But if the entire temperature change exceeds this minimum count, then counts for two temperature changes are calculated. The first count is for the change in $D_{OUT}$ from printing the first 1500 columns (a first portion of the pattern), and the second count is for the change in $D_{OUT}$ from printing the 4501 through 6000 columns (a second portion of the pattern)(74). From these temperature change values, a ratio is calculated for determining the ink flow through the pen (76). It has been determined from study that a ratio less than 31 indicates the pen has sufficient ink flow. If the ratio is less than 31 (78), the pen is deemed to have sufficient ink and printing is allowed to commence (80). However, if the ratio at this point is 31 or greater, then the pen is deemed to have insufficient ink flow (82) and the operator is notified (72). This notification by microprocessor 14 via the status lines may take the form of a message printed on an LCD screen of the printing device, of an audio alarm or of other suitable means. In addition, the printing device will stop printing to prevent the loss of printed material.

Figure 5:
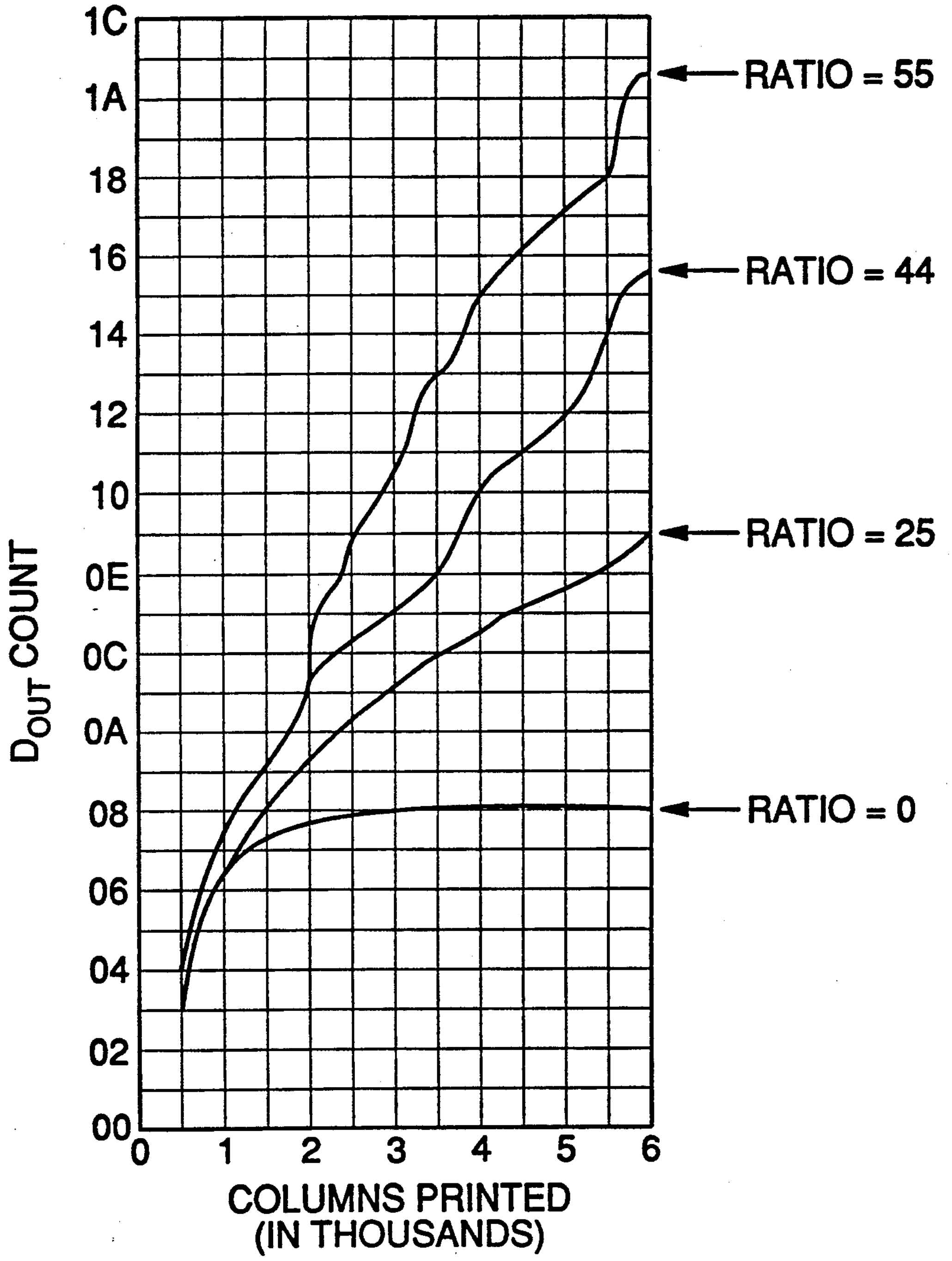
FIG. 5 is an example graph illustrating the ratios of temperature changes used for determining the sufficiency of the ink flow.

FIG. 5 illustrates how the ratio is calculated from the count of $D_{OUT}$ and how the ratio increases with temperature. It shows four curves selected from 14 test patterns run for a pen. With a full pen, the ratio is the lowest curve in the chart. The first temperature change measured over the printing of the first 1500 columns of the pattern produced a $D_{OUT}$ count of about 7. The second temperature change measured over the printing of the last 1500 columns produced a $D_{OUT}$ count of about 0. The ratio when normalized by a factor of 100 is thus 0 (76). As ink is depleted from the pen through printing, this ratio rises. The second lowest curve, with the pen near the end of its useful life, reveals a ratio of 25 as the temperature change across the last 1500 columns produces a count of 3. This trend is repeated in the third curve (the pen now out of ink) and fourth curve (the pen now completely dry). In each curve the count continues to increase as the rate of ink flow continues to drop.

To conserve ink, it is desirable to repeat the test pattern only when it is determined that the pattern is necessary. This determination is made by checking the ratio after each printing of a predetermined number of dots which consume a substantial amount of ink. FIG. 4 illustrates a preferred approach. After printing each page, (90) the ratio is checked to see if it is less than 19 (92). If it is, the pen is deemed to have a high ink flow (94). Consequently, the test pattern is printed only if ten million (10M) dots have been printed since the last pattern was printed (96, 98). If fewer than ten million dots have been printed, the test pattern is not yet reprinted. The checking procedure is then complete until the next page is printed (100).

Eventually a test pattern is repeated, by which point the ratio will have risen. Once it is found to be equal to or greater than 19 (92), the pen is deemed to have a low ink flow (102). The test pattern is then repeated after only four million (4M) dots have been printed (104, 106). This insures that the ink flow is more closely monitored as the ink is depleted from the pen. If fewer than four million dots have been printed, the test pattern is not yet reprinted. The checking procedure is again complete until the following page is printed (100).

At some point, the ratio will rise to 31 after a test pattern is printed (78), the pen will be deemed to have insufficient ink flow (82), the operator will be notified and the printing stopped.

Having illustrated and described the principles of the invention in a preferred embodiment, it should be apparent to those skilled in the art that the invention can be modified in arrangement and detail without departing from such principles. We claim all such modifications and equivalents coming within the spirit and scope of the following claims, which are not intended to be limited to the exemplary embodiment described herein.

We claim:

1. A method of detecting ink flow through a thermal inkjet printhead, comprising:

sensing temperature of the printhead as the printhead prints;

calculating a change in printhead temperature from temperature values sensed; and determining from the change in printhead temperature whether ink flow through the printhead is sufficient for printing.

2. The method of claim 1 including indicating if the ink flow is insufficient to sustain printing.

3. The method of claim 1 including stopping the printing if the ink flow is insufficient to sustain printing.

4. The method of claim 1 wherein the temperature change calculated is a second change and the determining steps includes:

calculating a first change in printhead temperature from temperature values sensed;

comparing the first change in temperature to the second change in temperature; and based on the comparing of the first and second temperature changes, determining whether the ink flow is sufficient.

5. The method of claim 4 wherein the determining step comprises:

printing a test pattern;

calculating the first temperature change in the printhead resulting from printing a first portion of the test pattern;

calculating the second temperature change in the printhead resulting from printing a second portion of the test pattern; and calculating a ratio of the two temperature changes.

6. The method of claim 5 including repeating the test pattern at selected printing intervals to determine new ratios.

7. The method of claim 6 wherein the print intervals are selected numbers of dots printed by the printhead, the interval selected depending upon a last determined ratio of the temperature changes.

8. The method of claim 4 wherein the determining step comprises comparing a ratio of the first and second temperature changes against selected values to determine a rate of ink flow through the printhead.

9. The method of claim 1 wherein sensing the temperature of the printhead as it prints comprises determining a resistance of a thermal sense resistor, the resistance of the resistor varying with the temperature of the printhead.

10. The method of claim 1 including:

determining a least resistance of a thermal sense resistor, the resistance of the resistor varying with temperature;

determining if a signal from the resistor representative of the temperature of the printhead has sufficient range for the temperature change comparison; and if not, adjusting gain of the resistor signal until the signal has sufficient range.

11. The method of claim 1 wherein the printhead includes a substrate and the sensing step comprises sensing the temperature of the printhead substrate.

12. An apparatus for detecting ink flow through a thermal inkjet printhead, comprising:

a thermal sense resistor for sensing temperature of the printhead as the printhead prints and producing a resistance proportional to the temperature;

a data processor operably connected to the thermal sense resistor for:

calculating a change in printhead temperature from temperature values sensed by the resistor; and determining from the change in printhead temperature whether ink flow through the printhead is sufficient for printing.

13. The apparatus of claim 12 wherein the data processor is programmed to cause the printhead to print a test pattern for measuring the temperature, the test pattern providing a basis from which the data processor may interpret the ink flow from the change in temperature.

14. The apparatus of claim 12, including an inkjet printer containing the temperature sensor and data processor.

15. An apparatus for detecting ink flow through a thermal inkjet printhead, comprising:

a temperature sensor for sensing temperature of the printhead as the printhead prints; and detector circuitry in communication with the temperature sensor for:

calculating a first change in printhead temperature from temperature values sensed by the temperature sensor;

calculating a second change in printhead temperature from temperature values sensed by the temperature sensor;

comparing the first change in temperature to the second change in temperature; and based on the comparing of the temperature changes, determining ink flow through the printhead.

16. The apparatus of claim 15 wherein the temperature sensor comprises a thermal sense resistor.

17. The apparatus of claim 6 wherein the detector circuitry is constructed to select a resistance range for the thermal sense resistor for measuring the first and second changes in temperature of the printhead.

18. The apparatus of claim 15 wherein the detector circuitry comprises a data processor.

19. The apparatus of claim 15 wherein the printhead prints a test pattern during which the first and second changes in temperature are measured.

20. The apparatus of claim 15 including a thermal inkjet printer containing the printhead, thermal sensor and detection circuitry.

* * * * *